United States Patent [19]

Hammond

[11] 4,304,521
[45] Dec. 8, 1981

[54] METHOD FOR HANDLING PALLETIZED LOADS

[76] Inventor: Theodore A. Hammond, 3575 - 52nd St. SE, Kentwood, Mich. 49508

[21] Appl. No.: 967,879

[22] Filed: Dec. 8, 1978

[51] Int. Cl.³ .................... B65G 1/06; B65G 13/00
[52] U.S. Cl. .................... 414/786; 414/276; 414/286; 193/35 A; 193/35 SS; 227/156
[58] Field of Search ............. 414/276, 235, 239, 786; 193/35 SS, 353 S; 104/135; 198/617; 108/514, 54.1, 57.1; 280/80 B; 227/156; 29/402.01

[56] References Cited

U.S. PATENT DOCUMENTS

| | | | |
|---|---|---|---|
| 2,982,507 | 5/1961 | Woodward | 108/57.1 |
| 3,011,665 | 12/1961 | Wise | 280/80 B X |
| 3,108,671 | 10/1963 | Fuka et al. | 193/35 A |
| 3,130,829 | 4/1964 | Long | 104/135.4 X |
| 3,750,804 | 8/1973 | Lemelson | 414/276 |
| 3,753,507 | 8/1973 | James et al. | 414/276 |
| 4,044,876 | 8/1977 | Hammond | 193/35 SS |

Primary Examiner—Trygve M. Blix
Assistant Examiner—L. E. Williams
Attorney, Agent, or Firm—Blanchard, Flynn, Thiel, Boutell & Tanis

[57] ABSTRACT

A method wherein palletized loads are deposited on a gravity-type conveyor at the upper end, and are moved by gravity toward the lower end, with the palletized loads being stored on the conveyor until the load at the lower end is removed, whereupon the loads are then automatically advanced downwardly. The conveyor includes a pair of parallel roller assemblies which vertically cyclically reciprocate according to a preselected pattern, the reciprocation of the roller assemblies being controlled by pneumatically inflatable hoses. Upon inflation, the roller assemblies are lifted upwardly to permit gravity-urged advance of the palletized loads, and upon deflation the loads are automatically lowered into braking engagement with stationary brake flanges positioned adjacent the roller assemblies. The wood pallets are positioned so that the outermost stringers are not disposed directly over the rollers, but rather are positioned directly over the braking flanges so that the repetitive lowering and hence impacting of the pallets on the braking flanges causes the nails associated with the lower deckboards to be continually pounded into the stringers.

8 Claims, 6 Drawing Figures

METHOD FOR HANDLING PALLETIZED LOADS

FIELD OF THE INVENTION

This invention relates to an improved method of handling palletized loads to minimize deterioration of wood pallets due to loosening of the nails.

BACKGROUND OF THE INVENTION

In recent years, the grocery industry has extensively adopted the use of wooden pallets for storing and handling of goods. The palletized goods are normally stored in warehouses or centralized distribution centers, from which the goods are then distributed to numerous retail outlets. By maintaining the goods on the pallets, the goods can thus be stacked on the pallets at the manufacturer and shipped to the centralized distribution center, with the goods then being maintained and stored on these pallets. Following unloading, the pallets are recycled for further use. This system greatly simplifies the handling, storing and shipment of the goods. To further simplify the handling within the warehouse or distribution center, and to permit proper rotation of goods, these centralized warehouses have also adopted rack-type storage systems employing conveyors which permit the goods to be stored and handled on a "first in-first out" basis.

One of the problems experienced with the use of palletized loads, and their handling and storing on roller-type conveyors, is that of pallet deterioration and the resulting damage to the conveyor rollers. As the wood pallets are used, which involves the depositing thereon of rather heavy loads and the movement thereof by forklifts and other devices, the nails in the pallet tend to loosen which results in the nail heads being slightly exposed. This is particularly critical with respect to the nails which secure the bottom deckboards to the intermediate stringers. When these pallets, particularly with a heavy load thereon, are deposited on a roller conveyor, the stringers are normally positioned directly over the rollers so as to permit proper transfer of load from the pallet to the conveyor. If the bottom nail heads protrude slightly from the bottom deckboards, then the nail heads directly contact the rollers and cause gouging thereof. The surfaces of the rollers thus become damaged sufficiently to prevent efficient free movement of the pallets thereover, such that replacement of the rollers is necessary.

This problem of the nails continually loosening during handling of the loaded pallets also requires that the pallets be reconditioned in order to permit their continued use. This reconditioning normally involves manual inspection of the pallets, and a hammering of the nails back into the stringers. This is obviously a manual operation which is both time consuming and costly.

Accordingly, the present invention relates to an improved conveyor-type storage method for palletized loads employing wood pallets so as to overcome or at least minimize the above problems by permitting the nails associated with the lower deckboards to be continuously impacted against braking flanges associated with the conveyor to thereby prevent loosening of the nails.

In the method of this invention, the palletized loads are deposited on a gravity-type conveyor at the upper end thereof, and are moved by gravity toward the lower end, with the palletized loads being stored on the conveyor until the load at the lower end is removed, whereupon the loads are then automatically advanced downwardly. The conveyor includes a pair of substantially parallel roller assemblies which vertically cyclically reciprocate up and down according to a preselected pattern, the reciprocation of the roller assemblies being controlled by pneumatically inflatable hoses positioned below the roller assemblies. Upon inflation, the roller assemblies are lifted upwardly to permit gravity-urged advance of the palletized loads, and upon deflation the loads are automatically lowered into braking engagement with stationary brake flanges positioned adjacent the roller assemblies. The wood pallets are positioned so that the outermost stringers are not disposed directly over the rollers, but rather are positioned directly over the braking flanges so that the repetitive lowering and hence impacting of the pallets on the braking flanges causes the nails associated with the lower transversely-extending deckboards to be continually pounded into the stringers. In this manner, not only are the nails in the lower deckboards positioned so that they do not contact and damage the rollers, but they are also continuously subjected to impact forces so that the nails have little opportunity to significantly loosen.

Figure 1:
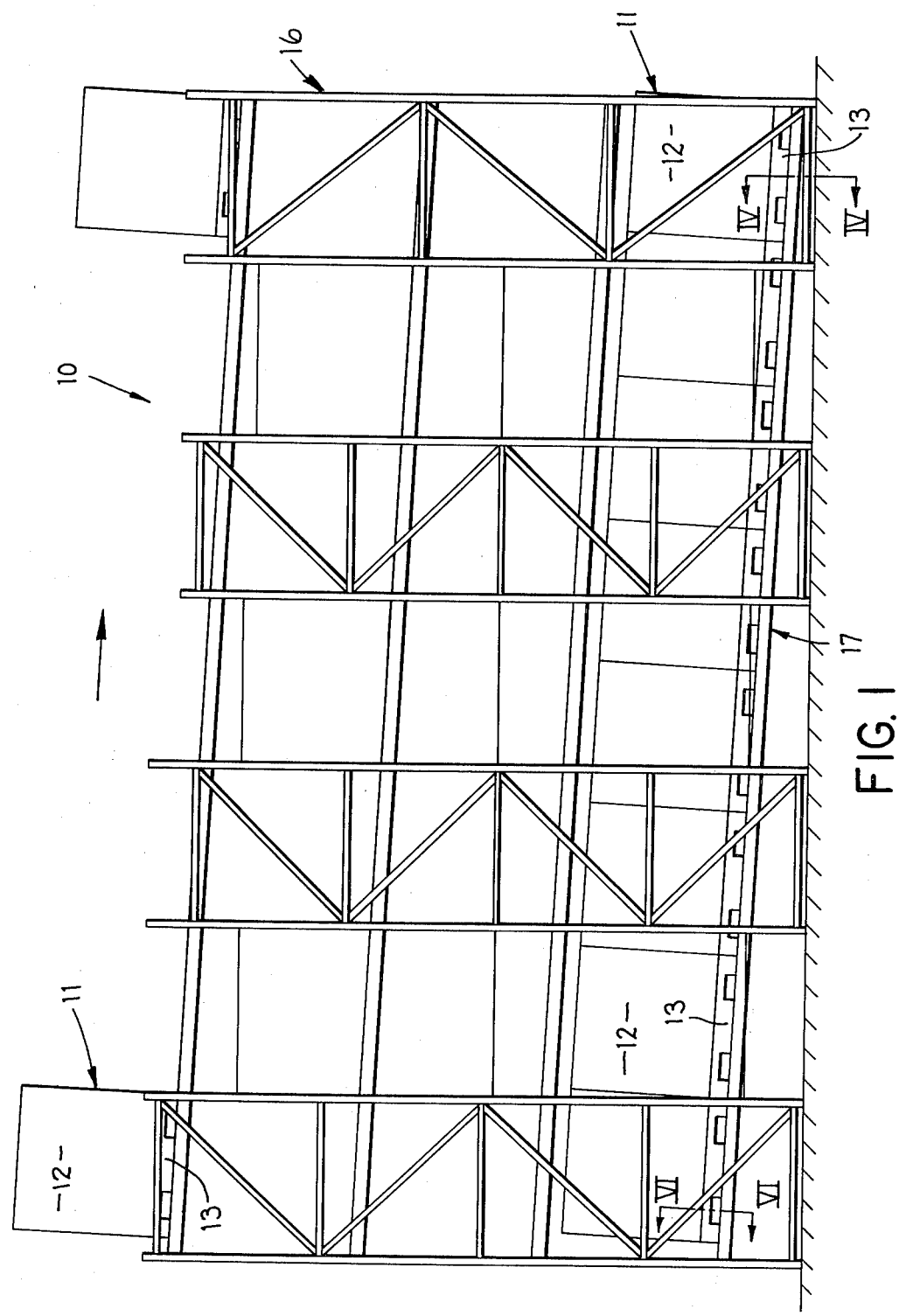
FIG. 1 is a side view of a conveyor-type storage system for palletized loads.

Certain terminology will be used in the following description for convenience in reference only. For example, the words "upwardly", "downwardly", "rightwardly" and "leftwardly" will refer to directions in the drawings to which reference is made. The words "downwardly" and "forwardly" will also refer to the normal direction of movement of the palletized loads, which direction is from left to right in FIGS. 1 and 5. The words "inwardly" and "outwardly" will refer to directions toward and away from, respectively, the geometric center of the apparatus and designated parts thereof. Said terminology will include the words specifically mentioned, derivatives thereof, the words of similar import.

DETAILED DESCRIPTION

Figure 2:
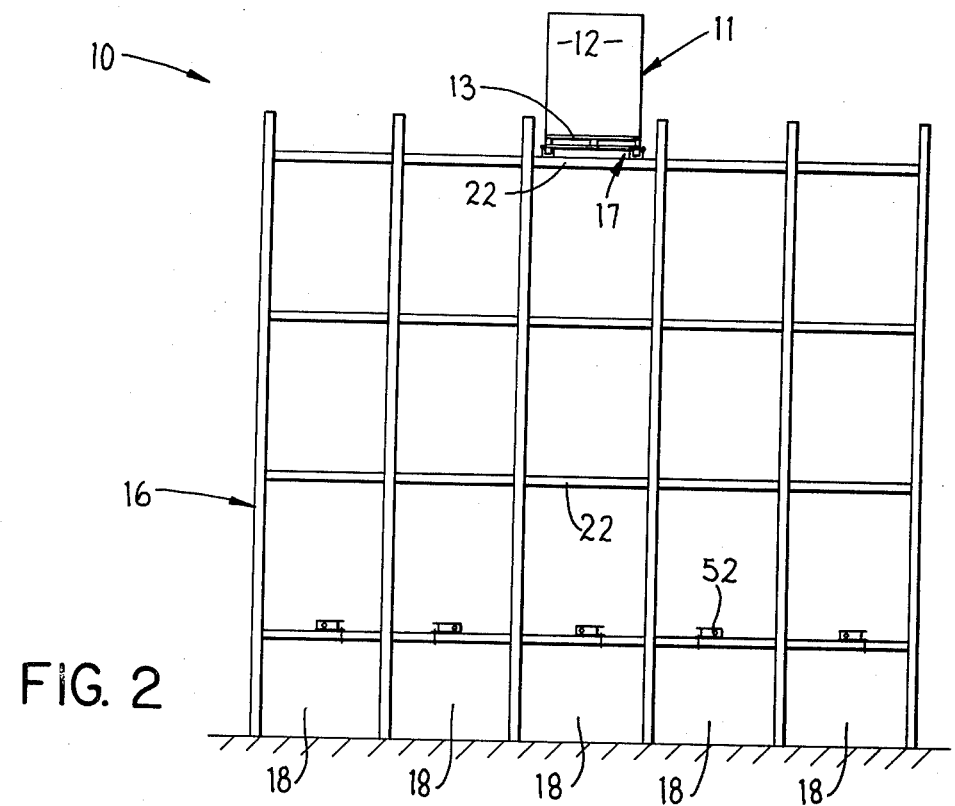
FIGS. 2 and 3 respectively illustrate the input and output ends of the storage system, said figures respectively illustrating the left and right ends of FIG. 1.
Figure 3:
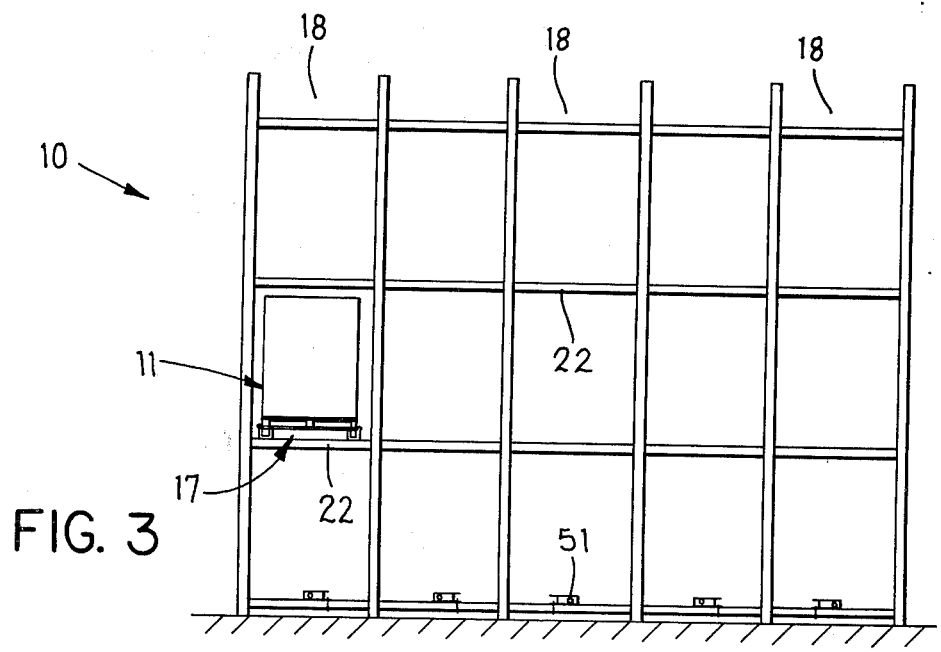

FIGS. 1–3 illustrate a conveyor-type storage system 10 designed specifically for handling and storing palletized loads 11, which loads comprise suitable articles or goods 12 stacked on a conventional wood pallet 13, such as a standard GPC pallet. The storage system 10 is formed by a rack-type framework 16 so as to support thereon a plurality of gravity-type storage conveyors 17 which are of the "first in-first out" type. In the illustrated embodiment, the storage system 10 includes five adjacent bays or columns 18, each having four vertically stacked conveyors 17 associated therewith.

Figure 4:
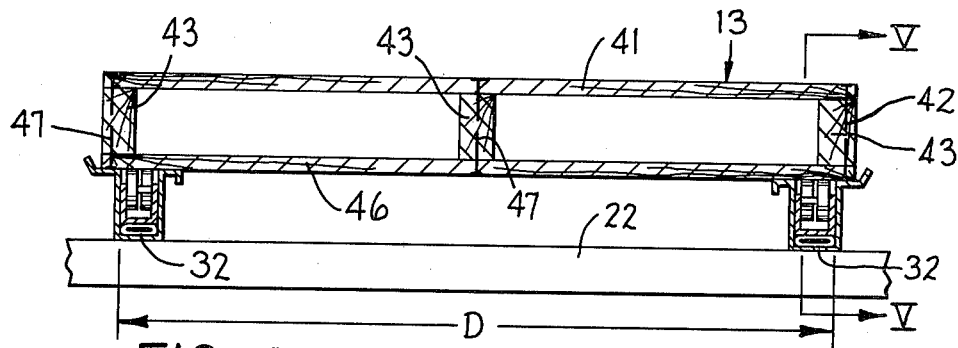
FIG. 4 is a fragmentary, enlarged, cross-sectional view through one of the conveyors and illustrating a pallet positioned thereon, this view being approximately along the line IV—IV in FIG. 1.
Figure 5:
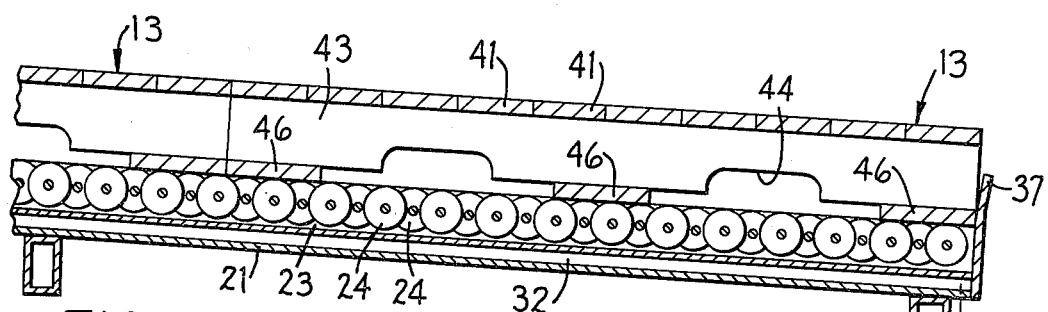
FIG. 5 is a fragmentary sectional view taken substantially along the line V—V in FIG. 4.
Figure 6:
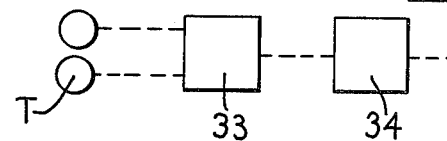
FIG. 6 is an enlarged, fragmentary sectional view taken along line VI—VI in FIG. 1.
Figure 6:
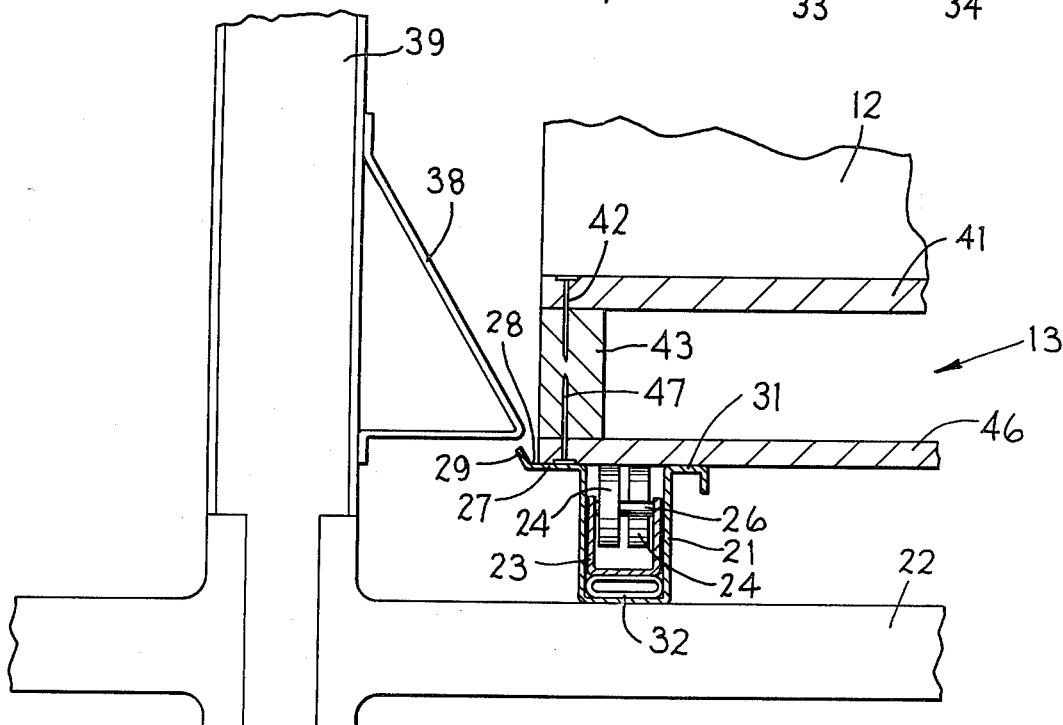

The gravity-type storage conveyor 17 extends longitudinally of the system 10, and is inclined downwardly at a small angle as it extends from the inlet end (leftward end in FIG. 1) to the outlet or discharge end (rightward end in FIG. 1). The conveyor 17, as illustrated in FIGS. 4–6, includes a pair of stationary parallel support channels 21 which extend longitudinally of the storage system at a slight downward incline, being supported on transverse frame members 22. Each support channel 21 has a lift channel 23 positioned therein and vertically slidable relative thereof, this lift channel in turn having rotatably supported thereon a plurality of rollers 24 by means of support pins 26. The rollers 24, which comprise conventional skate rollers, are preferably disposed in two adjacent rows, with the rollers in these two rows being staggered as illustrated in FIG. 5 to provide a more continuous support surface for engagement with the lower deck boards of the pallets 13.

The support channel 21 has an outer flange 27 fixed to the upper leg thereof and projecting sidewardly therefrom. This flange 27 extends longitudinally throughout the complete length of the support channel and the upper surface 28 thereof defines a braking and impact surface for engagement with the pallets 13. The outer edge of flange 28 terminates in an inclined flange 29 which projects outwardly and upwardly at an angle preferably of approximately 60° relative to the horizontal. This flange 29 is provided for effecting recentering of the pallets, as explained hereinafter. The support channel 21 also has a further flange 31 fixed to the upper end of the other leg and projecting sidewardly therefrom, which flange 31 is disposed for engagement with the lower surface of the pallets 13 to effect braking thereof.

Each roller assembly, that is the rollers 24 and the lift channel 23, is vertically reciprocated relative to the support channel 21 by means of an elongated inflatable hose 32 which extends longitudinally along and is confined between the bottom walls of the channels 21 and 23. The hoses 32 associated with the pair of roller assemblies are connected to a suitable power source 33, such as an air compressor, the latter being activated and regulated by a suitable control unit 34, such as a conventional time-controlled valve, so that the hoses 32 are cyclically inflated and deflated in an intermittent yet regulated manner, such as approximately 15 to 25 cycles per minute, whereupon the lift channel 23 and rollers 24 are cyclically raised and lowered in a reciprocating manner relative to the support channel 21 at a rate corresponding to the pulse rate of the hoses 32 This thus causes the rollers 24 to be intermittently raised so as to engage the pallets 13 and lift them upwardly out of engagement with the flanges 27 and 31, whereby the loaded pallets advance by gravity along the conveyor, with the roller assemblies then being lowered whereupon the pallets are lowered into engagement with the flanges 27 and 31 to cause braking and stoppage thereof. By cyclically raising and lowering the roller assemblies at a predetermined rate, the gravity-urged speed of the loaded pallets along the conveyor is effectively controlled so as to prevent runaway of the loaded pallets. Further, whenever this system is shut down, or if the system should experience a failure, then the pallets are automatically lowered into engagement with the braking flanges to thereby effect a safe shutdown of the system.

To maintain the palletized loads in a storage condition on the conveyor, same is provided with a stop flange 37 at the lower or discharge end thereof. This flange 37 is disposed for engagement with the pallet located directly at the discharge end of the conveyor, and the flange preferably is disposed at a slight incline as it projects upwardly so as to provide sufficient clearance to permit tilting and lifting of the loaded pallet, as by means of a forklift. This thus permits removal of the frontmost pallet without requiring that the remaining pallets be held back by separate escapement devices or the like. This flange 37 also holds back the frontmost pallet, even when the pallet is cyclically raised and lowered due to pulsing of the conveyor, as described hereinafter.

The upper or inlet end of the conveyor is provided with tapered guides or cams 38 for automatically centering the loaded pallet as it is deposited on the conveyor by means of a forklift or other device. These centering guides 38 are fixedly secured to the adjacent vertical frame members 39, and effectively act as a continuation of the centering flanges 29 since they also preferably extend upward at an angle of approximately 60°.

Considering now the pallet 13, the grocery industry has adopted a standardized wood pallet commonly referred to as a GPC pallet. This pallet, as illustrated in FIGS. 4–6, includes a plurality of wooden top deckboards 41 which extend transversely of the pallet and are positioned either closely adjacent or slightly spaced apart. These top deckboards 41 are fixedly secured to three underlying wood stringers 43 by means of nails 42. The two outermost stringers are disposed closely adjacent the side edges of the pallet, whereas the third stringer extends longitudinally along the center of the pallet. The lower deck of the pallet is formed by at least three lower deckboards 46 which are also of wood and extend transversely across the stringers, being secured thereto by nails 47. The stringers are also normally provided with recesses or notches 44 to permit a forklift to engage the pallet from the end if necessary.

The GPC pallet has a width, as measured transversely between the outside faces of the outer stringers, of 40 inches. The stringers themselves are between $1\frac{3}{4}$ and 2 inches in width. To insure that the nails 47 which secure the lower deckboards 46 to the stringers 43 do not contact the rollers 24, the two roller assemblies are normally spaced apart by a distance such that the rollers contact the lower deckboards 46 at a location closely adjacent but spaced just inwardly from the outer stringers 43, as illustrated in FIG. 4. This permits the rollers to contact the pallet directly adjacent the stringers so as to utilize the strength of the pallet and permit efficient transfer of loads through the pallet to the rollers, while at the same time preventing the lower nails 47 from contacting the rollers, thereby insuring that the nails are constantly pounded against the stationary braking flanges 27 as the loads are alternately lifted and lowered in a repetitive manner during their gravity-urged movement along the conveyor.

To achieve the above relationship, the maximum spacing D between the inner edges of the flanges 27 is normally between approximately $3\frac{1}{2}$ to 4 inches less than the width of the pallet. Further, to insure that the pallets remain properly aligned so as to prevent the nails 47 from moving sidewardly out of engagement with the brake flanges, the normal clearance between the side edge of the pallet and the adjacent guide or recentering flange 29 is normally between approximately $\frac{1}{4}$ and $\frac{1}{2}$ inch. Further, the individual brake flanges 27 normally have a preferred minimum width of two inches and a preferred maximum width of three inches, although in some circumstances the maximum width of the brake flanges can be increased up to approximately five inches. By normally maintaining the brake flange width within the range of two to three inches, the outer stringers 43 can always be maintained directly over the brake flanges so that the nails 47 will be repetitively impacted against the braking surfaces 28, while at the same time the rollers 24 will still engage the lower deckboards 47 at a location positioned just inwardly from the outer stringers 43 so as to avoid application of undesirable loads and stresses on the lower deckboards at locations remote from points of support.

During operation, the loaded pallet is cyclically raised and lowered several times a minute during the forward gravity-urged advance of the loaded pallet along the conveyor. Since the pallets are normally heavily loaded, which load may be as great as several thousand pounds, the repetitive lowering of the pallet against the braking flanges 27, which flanges are normally constructed of steel plate, thus keeps the nails 47 pounded into the pallet so that the pallets retain their strength and rigidity even though continuously and repetitively utilized over long periods of time. This thus eliminates or greatly minimizes the manual rebuilding or repair of the pallets. The inclined centering flanges 29 automatically cause the pallet to be sidewardly recentered during the lowering phase of the cycle, whereby the nails are thus continually positioned over the flanges 27.

In the storage apparatus of the present invention, same is provided with control devices associated with the inlet and discharge ends thereof to facilitate the automatic advance of the palletized loads stored thereon. These control devices are preferably automatically activated whenever a loaded pallet is positioned on one of the conveyors at the input end, or whenever a loaded pallet is removed from one of the conveyors at the discharge end. For this purpose, the discharge end of the storage system is provided with a sensor 51 associated with each of the bays 18. The sensor 51, which in a preferred form comprises a photoelectric cell such as a type 42 RLP photoelectric switch manufactured by Electronics Corporation of America, senses the presence of a forklift or other suitable device utilized for removing a loaded pallet from the storage system. The photo switch 51 projects a light beam vertically of the bay directly adjacent the discharge end thereof. Thus, when a forklift is driven up to the bay so as to engage a palletized load within one of the associated conveyors, the light beam will reflect from the forklift to thereby activate the power system 33 associated with that bay. The pneumatic hoses associated with the conveyors of the selected bay will then be alternately and cyclically inflated and deflated such that, when the forklift removes the endmost palletized loads, the remaining palletized loads will be intermittently advanced downwardly along the conveyor until engaging the end stop. Upon activation by the sensor 51, the power system 33 will remain activated for a preselected time, due to the presence of an adjustable timer T associated therewith, which time is selected to permit the remaining palletized loads to advance downwardly so that the leading load again comes into contact with the end stop. Thereafter the timing-out of the timer T automatically deactivates the power system.

In a similar manner, a further sensor 52 is associated with each of the bays at the inlet end of the storage system, the sensor 52 also preferably being a photoswitch. When a forklift is moved into one of the bays for depositing a loaded pallet onto one of the conveyors associated with that bay, the photoswitch 52 will be activated so that power system 33 of that bay will be activated to thereby cause intermittent and cyclic raising and lowering of the roller conveyors associated with that bay, which actuation will occur for a preselected time so as to enable the palletized load to be advanced along the conveyor through a selected distance.

Further, other types of sensors, such as mechanical-type limit switches, could be utilized although a photoswitch has been found particularly desirable for controlling these operations.

Each of the sensors 51 and 52 preferably has a time delay associated therewith such that, if either of these sensors senses the presence of an object intersecting the light beam, the sensor will not immediately activate the power system 33, but rather will activate the power system only if the light beam is interrupted for a preselected period of time, such as approximately ¾ to 1 second. Thus, any accidental interruption of the light beam will not cause activation of the conveyors, but rather said conveyors will be activated only when a forklift is driven into position and is permitted to remain in position for at least the selected time prior to activation of the conveyors.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of storing and moving loaded wood pallets along an inclined roller-type gravity conveyor having a pair of elongated brake flanges and a pair of elongated roller assemblies disposed adjacent the brake flanges, the wood pallet having transversely extending top and bottom wood deckboards nailed to at least two longitudinally extending outer stringers which are disposed directly adjacent the opposite side edges of the pallet, comprising the steps of:

positioning the pallet on the conveyor adjacent the upper or inlet end thereof such that the bottom deckboards extend transversely across the conveyor with the outer stringers being disposed substantially directly over the brake flanges so that the nails which secure the bottom wood deckboards to the outer stringers are also positioned directly over the brake flanges and are sidewardly spaced from the roller assemblies; raising the roller assemblies upwardly relative to the brake flanges such that the rollers directly engage the bottom wood deckboards at a location directly adjacent but spaced slightly inwardly from the outer stringers for lifting the pallet upwardly a limited extent out of engagement with the brake flanges;

permitting the pallet to move downwardly along the conveyor due to the urging of gravity when the pallet is held out of engagement with the brake flanges;

lowering the roller assemblies and the pallet supported thereon so that the outer ends of the bottom deckboards in the regions where they are nailed to the outer stringers are pounded against the brake flanges to both prevent loosening of the nails and effect stopping of the pallet;

repeating the above raising and lowering steps in a cyclic manner at the rate of several cycles per minute to effect controlled gravity-urged movement of the pallet along the conveyor coupled with repetitive impacting of the outer ends of the bottom deckboards against the brake flanges to prevent loosening of the nails and cause intermittent stopping of the pallet; and effecting automatic recentering of the loaded pallet during the lowering thereof for maintaining the nails positioned directly over the brake flanges.

2. A method according to claim 1, including the steps of:

sensing when a loaded pallet is removed from the lower discharge end of the conveyor; and automatically initiating the cyclic raising and lowering of the roller assemblies associated with said conveyor, responsive to said sensing, so that the other loaded pallets on said conveyor will be advanced toward the lower discharge end.

3. A method according to claim 2, including the steps of initially delaying the activation of said conveyor for a preselected time after the sensing of an activating signal to insure activation only in those situations where a pallet-removing vehicle is properly moved into position to effect removal of a loaded pallet.

4. A method according to claim 2, including sensing the depositing of a loaded pallet on the conveyor at the upper inlet end thereof; and automatically activating the cyclic raising and lowering of said conveyor, after sensing the loaded pallet as recited above, to automatically cause the loaded pallet to be moved downwardly along the conveyor away from said inlet end.

5. A method according to claim 1, including providing a fixed guide flange which projects upwardly and outwardly relative to the brake flange at an angle of approximately 60° relative to the horizontal for effecting recentering of the pallet during lowering thereof.

6. A method according to claim 1, wherein the perpendicular width between the outer edges of the brake flanges is a maximum of one inch greater than the transverse width of the pallet, and wherein the brake flanges have a width in the range of between two and three inches.

7. A method according to claim 6, wherein said roller assemblies are disposed closely adjacent the inner edges of the brake flanges so that the rollers engage the bottom deckboards at a location closely adjacent the respective outer stringer, whereby the nails which secure the outer ends of the bottom deckboards to the outer stringer are positioned directly over the brake flanges at all times.

8. A method according to claim 1, including providing each roller assembly with at least two adjacent rows of rollers, the rollers in each row being positioned closely adjacent one another, and the rollers in adjacent rows being longitudinally staggered to provide a more continuous support surface for the transversely extending bottom deckboards.

* * * * *